United States Patent

Koizumi et al.

[11] Patent Number: 5,335,187
[45] Date of Patent: Aug. 2, 1994

[54] METHOD AND APPARATUS FOR DYEING AND COLOR MATCHING LENSES

[75] Inventors: Shuzo Koizumi; Noriaki Uehara; Toru Kobayashi, all of Suwa, Japan

[73] Assignee: Seiko Epson Corporation, Tokyo, Japan

[21] Appl. No.: 726,409

[22] Filed: Jul. 10, 1991

[30] Foreign Application Priority Data

| Jul. 10, 1990 | [JP] | Japan | 2-182107 |
| Jul. 10, 1990 | [JP] | Japan | 2-182108 |
| Jul. 13, 1990 | [JP] | Japan | 2-186520 |
| May 24, 1991 | [JP] | Japan | 3-120339 |

[51] Int. Cl.$^5$ .......................... G01J 3/28; G01N 21/25
[52] U.S. Cl. ..................................... 364/526; 8/400; 8/507
[58] Field of Search ............... 364/525, 526; 8/400, 8/506, 507, 523

[56] References Cited

U.S. PATENT DOCUMENTS

| 3,993,435 | 11/1976 | Korver | 8/523 |
| 4,377,389 | 3/1983 | Haddad et al. | 8/506 |
| 4,490,495 | 12/1984 | Weber | 8/506 |
| 4,553,975 | 11/1985 | Su | 8/507 |
| 4,597,670 | 7/1986 | Ohashi et al. | 364/526 |
| 4,635,213 | 1/1987 | Murata et al. | 364/526 |
| 4,915,986 | 4/1990 | Elias et al. | 8/507 |
| 5,023,814 | 6/1991 | Guillemin | 364/526 |
| 5,052,337 | 10/1991 | Talcott et al. | 8/506 |

*Primary Examiner*—Thomas G. Black
*Assistant Examiner*—Michael Zanelli
*Attorney, Agent, or Firm*—Stroock & Stroock & Lavan

[57] ABSTRACT

A color matching and lens dyeing apparatus and method in which a color is chosen, the color is converted to a numerical value on the basis of its transmissivity at different wavelengths of light and the transmissivity is converted into a lens dyeing prescription. The numerically determined information on the desired color is processed by a computer to obtain the proper compound ratios, dye baths and dyeing times. A set of standard dye baths are prepared and lenses are dyed therein. The dyed lenses are measured for transmissivity at different wavelengths and the transmissivity data is stored in a computer. To prepare a dying prescription, a target set of transmissivity characteristivity is selected and the transmissivity data of the standard dye baths is combined to obtain a dyeing prescription to obtain a dyed lens having the same transmissivity characteristics as the target.

22 Claims, 2 Drawing Sheets

METHOD AND APPARATUS FOR DYEING AND COLOR MATCHING LENSES

BACKGROUND OF THE INVENTION

The invention relates generally to colored lenses and more particularly to a method for color matching and dyeing lenses by converting color information into numerical values and using those numerical values to formulate a dyeing prescription.

Lenses are commonly colored by mixing additives, such as dispersable dyes and dyeing auxiliaries with water to yield a colored dye bath, heating the colored bath to about 70°-90° C. and dipping the lens into the dye bath. The density or intensity (concentration) of the lens coloring is determined by the length of time the lens is immersed in the dye bath and the temperature of the bath. When a dye bath is compounded with several types of dyes, the hue may also start to change with increased dipping time. Accordingly, selecting a particular dye bath and the toning that is necessary in order to obtain a desired color, as well as determining the dipping time and the work for color assessment and shading of the colored lens is highly labor intensive. It depends largely on the ability of skilled workers to make these determinations and is not well suited to mass production techniques. These drawbacks lead to increased costs and decreased quality control.

It typically takes at least about 2 years for an individual to develop the requisite skill to formulate a suitable dyeing prescription, including selecting the dye bath, dyeing times and compounding dyes and to make a proper judgment regarding the dyed color. Presently, the number of skilled workers is limited and this reduces the availability of dyed lenses as well as increasing the cost thereof. Furthermore, it is difficult for even skilled workers to obtain the desired color on the first try and this leads to repetitive dyeing operations for shading. This lowers productivity. In addition, different individuals attempting to match the same color will frequently prepare lenses having slight differences in color.

To reduce the number of man hours necessary for the lens dyeing procedure, lens dyers typically prepare a large number of standard dye baths. Each bath is for a particular color and standard dipping times are determined for each standard color bath. However, if a lens dyer is to have a large number of standard colors, as many standard dye baths are required. For example, more than 200 dye baths have to be available for the more than 200 standard SEIKO Colors available from the SEIKO Company. This large number of dye baths occupy excessive space in the lens dyeing facilities.

To dye lenses, an operator inspects a sample color and selects either an existing dye bath for a similar color from among those already prepared or prepares a fresh dye bath by mixing the appropriate dyes. The operator must then judge the appropriate dipping time in order to insure proper color density.

Computer color matching (C.C.M.) is becoming popular in other fields. A computer is used at a dyeing site for color matching dyes to selected colors. However, C.C.M. techniques have not yet been established for the dying and color matching of lenses, such as for eye glasses. Accordingly, C.C.M. is not available for the dyeing of lenses.

Conventional eye glass dyeing methods have additional drawbacks. Orders for colored eyeglass lenses are commonly received in one of two ways. In one case, a customer chooses from among standard colors of a colored lens maker. In a second situation, the selector chooses a nonstandard color and requests the lens dyer to match the selected color. Excessive delay is present between the time when the order is placed and when the final product is ultimately delivered. Transportation costs are involved and the responsibility for storing and caring for the lenses is spread among many individuals, rather than remaining at the point of sale.

Accordingly, it is desirable to overcome the drawbacks of conventional dyeing and color matching methods and to provide a dyeing and color matching method for lenses by which a suitable dyeing prescription can be prepared promptly by means of precise color matching so that a highly skilled operator is not required to engage in dyeing operations and to improve productivity and color quality of dyed lenses.

SUMMARY OF THE INVENTION

Generally speaking, in accordance with the invention, a color matching and lens dyeing apparatus and method are provided in which a color is chosen, the color is converted to a numerical value on the basis of its transmissivity at different wavelengths of light and the transmissivity is converted into a dyeing prescription. The numerically determined information on the desired color is processed by a computer to obtain the proper compound ratios, dye baths and dyeing times. A set of standard dye baths are prepared and lenses are dyed therein. The dyed lenses are measured for transmissivity at different wavelengths and the transmissivity data is stored in a computer. To prepare a dying prescription, a target set of transmissivity characteristivity is selected and the transmissivity data of the standard dye baths is combined to obtain a dyeing prescription to obtain a dyed lens having the same transmissivity characteristics as the target.

Accordingly, it is an object of the invention to provide an improved method and apparatus for the color matching and dyeing of lenses.

Another object of the invention is to provide a method for determining dyeing prescriptions and dyeing times by computer.

A further object of the invention is to decrease the need for maintaining large numbers of dye baths of standard colors.

Still another object of the invention is to make it easier to dye lenses to match a particular color.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
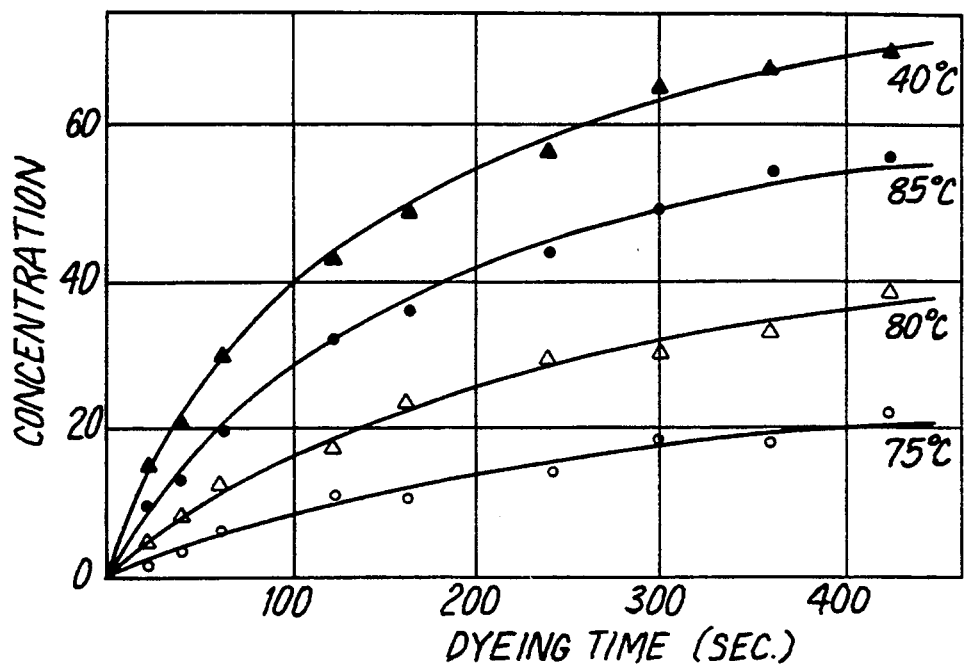
FIG. 1 is a graph showing the effects of temperature and dying speed on dye concentration of a synthetic resin lens.

The lens dyeing and color matching method and apparatus in accordance with the invention is particularly well suited for the selection of the color of eyeglass lenses at the retail level. A customer chooses a color and information regarding the color chosen is numerically determined at an optician's shop or the like. This information is transmitted to a dyeing plant or to another data processing facility so that a suitable dyeing prescription can be determined from that numerical information. The numerical information is processed by a computer to obtain the compounding ratio of dyes for dye baths and the times the lens is to be immersed in the dye baths.

After a lens is dyed, the dyed lens can be analyzed by a spectrophotometer in order to obtain numerical data or color. Such data can be processed by a computer to check the color of the lens. If the lens color is rejected, a further dyeing prescription can be obtained by determining the compounding ratio of dyes, suitable dye baths and dyeing times, on the basis of numerical data regarding a selected color.

To generate a prescription for dyeing a lens, spectral characteristics of a dyed sample lens (target) and a starting lens are measured. The difference in spectral characteristics between the dyed sample lens and the lens material to be dyed is converted into a sum of unit concentrations which are defined as the relative strength of intensity characteristics of a dye bath for the lens. The relative intensity characteristics of one or more types of dye baths are combined to match the relative intensity characteristics of the target sample dyed lens. The relative amount of relative intensity characteristics of each individual dye bath to be added to achieve the target is converted into the dyeing time for the respective dye bath. The amount to be added by the relative intensity and characteristics of each dye bath can also be converted into a compounding amount of dye for a respective dyeing time.

Information regarding color includes, but is not limited to:

(1) spectral characteristics (spectral transmittance, spectral absorbtivity, spectral reflectance);
(2) tristimulus values;
(3) the three attributes of color (value, chroma, hue);
(4) value on chromaticity coordinate; and
(5) equivalent color spatial coordinate value.

This information can be communicated with an on-line communication system, the telephone or by facsimile transmission.

In order to dye a lens, the color characteristics of the undyed lens are determined and compared to those of a sample finished dyed lens. The sample finished lens is referred to herein as the target. The maximum difference in spectral transmittance between the dyed lens and the undyed lens material at a particular given wavelength is set at "1". The difference in transmittance at a different wavelength is then converted into a ratio compared to 1 to define the relative intensity characteristic of the dye bath to the lens. The thus obtained relative intensity characteristic is a fundamental unit for characterizing a particular dye bath.

In order to compile a data bank of spectral characteristics of a group of dye baths, n dye baths (n is a positive integer) of different colors and shades are prepared and undyed lenses are dyed in the n baths. The spectral characteristics of the lenses dyed in the different baths are then measured to determine the spectral transmittance characteristics of the n baths. For simplicity and to save space, n is preferably between 10 and 50, for convenience, and more preferably between 20 and 40. Too large a number of baths will take up too much room and too few baths will limit the number of target colors that can be matched. The information on spectral characteristics from the n baths is stored in a computer.

To dye a clear lens to a target color, the spectral characteristics of the target color are determined and the spectral characteristics of the dye baths are added together in a manner to match the spectral characteristics of the target. Any spectral characteristics of the undyed lens are added in as well. Thus, the difference in spectral characteristics between the target color and the undyed lens material is chromatically synthesized and each added amount corresponds to the dyeing concentration of the respective dye. This relationship is expressed as the following Formula 1.

$$K = Kl + C_1 K_1 + C_2 K_2 + \ldots + C_n K_n \tag{1}$$

K: Transmittance of Target Color
Kl: Transmittance of Lens Material
$C_{1-n}$: Concentration of Dyes $1-n$ (Number of Addition)
$K_{1-n}$: Relative Intensity Characteristic of dyes $1-n$ This chromatic synthesis can be continued with additional dyes added until a color is achieved that matches the target color virtually exactly. However, the use of tens of dyes and dye baths will undesirably increase the costs involved as well as the tediousness of the operation. Accordingly, it is preferable to limit the dyeing operation to about 3 to 10 and more preferably 4–5 dye baths. Consequently, the calculation for the chromatic synthesis should be terminated once the color of the lens is close enough to the target so that the difference in color cannot be judged visually.

In most cases, a dyed lens is acceptable and cannot be distinguished visually from a target if the deviation from the target color is within a CIELAB color difference of about 0.4 and more preferably about 0.3. However, if higher accuracy is desired, it is preferable to set the respective standard values for the differences in value, chroma and hue in accordance with the level of the concentration and chroma of the target color.

A second aspect of the dyeing operation in addition to the dye baths selected is the dyeing speed or the time in which a particular concentration of dye is added to a lens. The dyeing speed is related to the dyeing time (dipping time) and the temperature of the dye bath. The following Formula 2 is employed to express this relationship.

$$C_f = (t, T) = e^{cT + d} \cdot t^{aT+b} \tag{2}$$

a, b, c and d: Constants determined for Dyes
t: Time
: Temperature

If several lenses are to be dyed from the same dye bath, the bath will become decolorized. Accordingly, the data for dyeing from that bath must be adjusted to take into account the loss of dye. Dyeing must be adjusted for the change in concentration. This relates to the amount of decolorization of the dye bath from previous dyeing operations. The decolorization speed is expressed as a function of temperature and time in the following Formula 3.

$$D = (t, T) \quad (3)$$

Accordingly, the concentration (C) that will actually be dyed, and is used for formula (1), is expressed by the following Formula 4.

$$C = C_f + D \quad (4)$$

Therefore: $C = e^{cT+d} \cdot t^{aT+b} + D$

A suitable dyeing prescription, which includes the type of dye bath, the dyeing time and the temperature of the bath for dyeing a lens to a desired color can be obtained by solving Formulas 1–4.

In order to compound formulas for dyes for a dye bath, formula (1) can be transformed into the following Formula 5, for example $$K = Kl + a_1 K_1 + a_2 K_2 \ldots + a_n K_n \quad (5)$$

$$a_1 = C_1/\Sigma C_{1-n}, a_2 = C_2/\Sigma C_{1-n} \ldots a_n = C_n/\Sigma C_{1-n}$$

wherein $a_1$ is the theoretical compounding ratio of a dye to be included in the lens. However, the coloring characteristics of a particular dye will be slightly different than of a different dye. Therefore, it is necessary to multiply $a_1$ by a coefficient that is appropriate for the particular dye to be used. The appropriate coefficient for the dyes to be compounded is expressed by the following Formula 6.

$$K = Kl + k_1 a_1 K_1 + k_2 a_2 K_2 + \ldots + k_n a_n K_n \quad (6)$$

(where $k_1 + k_2 + \ldots k_n = 1$)

The temperature and total weight of dye are variables that can be calculated. A determination of the effects of dyeing speed in relation to dyeing temperature and total weight and compounding ratio of dyes results in too little improvement in the dyeing prescription accuracy, compared to the extensive effort required to make such a determination. Therefore, it is preferable to fix a standardized temperature for the dye baths, such as a temperature between about 75° C. to 95° C. and to fix a standardized amount of dye for the baths, such as between about 2 g/l to 5 g/l. It is also preferable to select dyes that have similar coloring characteristics in order to improve the dyeing prescription accuracy.

The color matching and dyeing methods in accordance with embodiments of the invention will be described with more particularity with reference to the following examples. These examples are presented for purposes of illustration only and are not intended to be construed in a limiting sense.

EXAMPLE 1

A dye bath was prepared with 1.4 g Eastman Polyester Blue GLF (Kyowa Sangyo) disperse dye, 0.1 g Miketon Polyester Rubine GL (Mitsui Toatsu) disperse dye, 0.4 g Miketon Polyester Brown GF (Mitsui Toatsu) disperse dye and 2 cc of auxiliaries, which were all dispersed in 1 liter of water and stirred well. To examine the effect of temperature of the dye bath, dye baths were heated to temperatures of 75° C., 80° C., 85° C. and 90° C. Undyed plastic lenses prepared by the thermal polymerization of diethylene glycol bisallyl carbonate were dyed in the dye baths at different temperatures for varying amounts of time in order to examine the relationship between temperature and dyeing time. The results of this investigation are plotted in FIG. 1 and the relationship is expressed below in Formula 7. The upper curve represents the 90° C. bath, the curve below that represents the 85° C. bath and the two curves below that represent the 80° C. and 75° C. baths, respectively in descending order.

$$1nC = (-0.17T - 15.85) 1n(t) + 0.19T - 16 \quad (7)$$

As shown in FIG. 1, higher temperatures lead to faster dyeing times and higher dye concentrations in the dyed lens.

A SEIKO Nouveau Color Brown 30 (SEIKO Standard Color) lens was selected as a target color lens and was measured with a spectrophotometer. The obtained data was synthesized, using the relative intensity characteristics of the dye bath of this Example, and a concentration coefficient of 29 was obtained. Formula 7 was then used to calculate the dyeing time which was calculated at 62 seconds at a temperature of 90° C. When an undyed lens was dyed for that period at that temperature, very little difference in color was observed, compared to the target colored lens.

EXAMPLE 2

Thirty dye baths of different colors were prepared and sample synthetic resin lenses were prepared by the thermal polymerization of diethylene glycol bisallyl carbonate, in a similar manner as in Example 1. The lenses were dyed in the thirty dye baths and were then examined to collect data with respect to coloring speed and decoloring speed. A dyeing prescription calculating program as described herein was programmed into a computer and the data from the coloring speed and decoloring speed tests were input into the computer to create a lens dyeing data bank.

A sample SEIKO Nouveau Color Amber 30 (SEIKO Standard Color) lens was selected as a target lens. It was measured by a spectrophotometer and the spectral transmittance at wavelengths from 390–730 mm were input into the computer. The data from the dye baths was processed by the computer to calculate the appropriate dyeing prescription to match the target color of the Seiko Nouveau Color Amber 30 lens. Four types of dye baths, from among the 30 dye baths, and appropriate dyeing times for each were obtained. The dyeing prescription is set forth below in Table 1.

TABLE 1

| ORDER OF DYEING | COMPOUNDING AMOUNT OF DYES | | AUXILIARY | TEMP | WATER | DYE TIME |
|---|---|---|---|---|---|---|
| 1 | Miketon Polyester Brown GF | 3.0 g | | | | 2 Min |
| | Miketon Polyester Rubine GL | 0.01 g | 2 cc | 90° C. | 1 l | 28 Sec |

TABLE 1-continued

| ORDER OF DYEING | COMPOUNDING AMOUNT OF DYES | | AUXILIARY | TEMP | WATER | DYE TIME |
|---|---|---|---|---|---|---|
| | Eastman Polyester Blue GLF | 1.2 g | | | | |
| 2 | Miketon Polyester Brown GF | 3.0 g | 2 cc | 90° C. | 1 l | 6 Sec |
| 3 | Eastman Polyester Blue GLF | 3.0 g | 2 cc | 90° C. | 1 l | 3 Sec |
| 4 | Miketon Polyester Rubine GL | 3.0 g | 2 cc | 90° C. | 1 l | 1 Sec |

A lens was dyed according to the prescription of Table 1 and was then inspected visually by being placed next to the sample Amber 30 lens. The dyed lens was almost the same color as the target lens and it was almost impossible to distinguish visually between the two. The dyed lens was then measured by a spectrophotometer to quantify the color difference from the target lens and the dyed lens was found to have a CIELAB color difference of 0.24. Accordingly, it was sufficiently close in color to pass the 0.4 standard.

EXAMPLE 3

Figure 2:
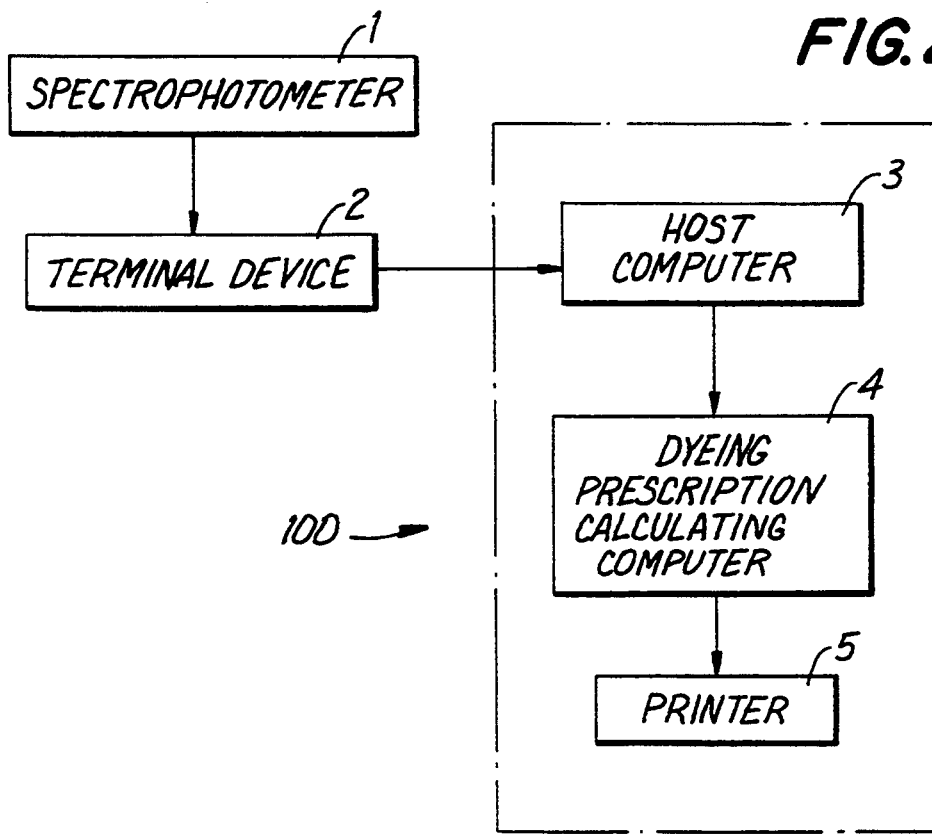
FIG. 2 is a block diagram of a lens dyeing apparatus, constructed in accordance with the invention.

FIG. 2 is a block diagram of a lens dyeing apparatus 100 constructed in accordance with the invention. Apparatus 100 includes a spectrophotometer 1 which measures the spectral characteristics of a lens and generates a signal applied to a terminal device 2 which transmits the color information measured by spectrophotometer 1, together with other processing instructions, to a host computer 3 through an online system. Host computer 3 adjusts the color information and transmits the adjusted color information to a dyeing prescription calculating computer 4 for processing. The dyeing prescription is then output at a printer 5. Spectrophotometer 1 and terminal device 2 can be located at an optician's shop, for example, and host computer 3 can be located at the main office or plant at which dyeing orders are received and administrated. The dyeing prescription calculated by computer 4 can be provided at each of the dyeing plants which can be located throughout the nation.

When a customer desires a lens to be dyed to a non-standardized color, a sample of the desired color is measured by a spectrophotometer at the optician's shop or other location to provide spectral characteristic data. The spectral characteristics together with other processing instructions are then transmitted to host computer 3 through an online system. Host computer 3 can then send the processing instructions to a particular plant, selected according to the appropriate type of lens desired and to match the appropriate delivery requirements. At the same time, the information on color (the spectral characteristic) is also transmitted to a computer at the dye plant through the online system.

Figure 3:
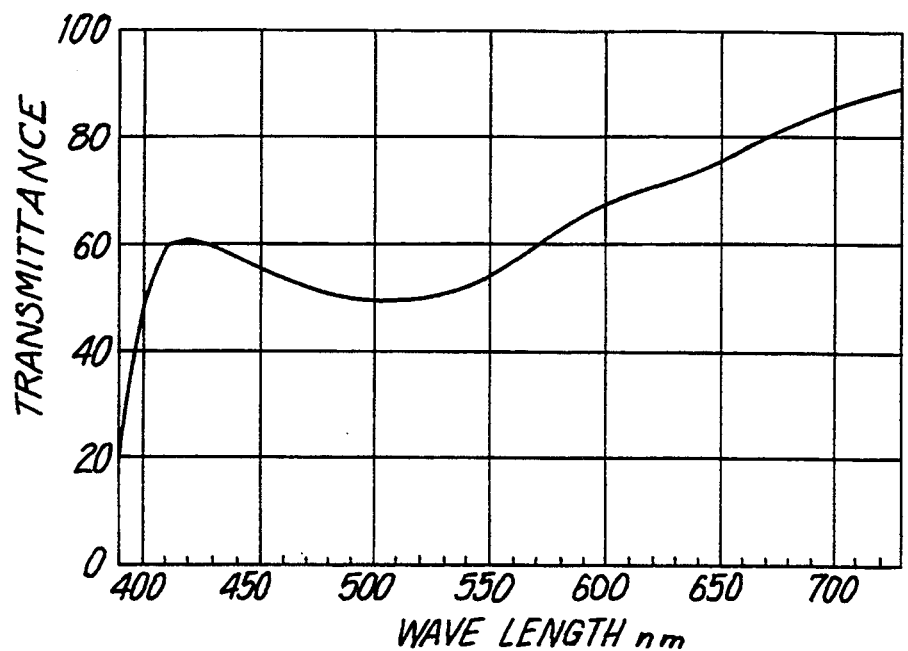
FIG. 3 is a graph showing the spectral transmittance of a sample lens.

FIG. 3 is a graph showing the spectral characteristics of a sample color that can be transmitted through the online system from the optician's shop. The lens material analyzed was a common lens type with a medium refractive index ($N_D1.56$) that was treated with hard-multi-coat processing. The dyeing prescription for attaining the target color was calculated, with dyeing prescription computer 4 and the prescription shown below in Table 2 was obtained. The lens was dyed in accordance with that prescription and thereafter, its color was measured with a spectrophotometer. The special characteristics generally matched those of the target color and a CIELAB color difference of only 0.32 was achieved, which is within acceptable limits.

TABLE 2

| ORDER OF DYEING | COMPOUNDING AMOUNT OF DYES | | AUXILIARY | TEMP | WATER | DYE TIME |
|---|---|---|---|---|---|---|
| 1 | Miketon Polyester Brown GF | 0.7 g | | | | 2 Min |
| | Miketon Polyester Rubine GL | 0.01 g | 2 cc | 90° C. | 1 l | 43 Sec |
| | Eastman Polyester Blue GLF | 1.3 g | | | | |
| 2 | Miketon Polyester Brown GF | 1.0 g | 2 cc | 90° C. | 1 l | 21 Sec |
| 3 | Eastman Polyester Blue GLF | 1.0 g | 2 cc | 90° C. | 1 l | 8 Sec |
| 4 | Miketon Polyester Rubine GL | 1.0 g | 2 cc | 90° C. | 1 l | 3 Sec |

Figure 4:
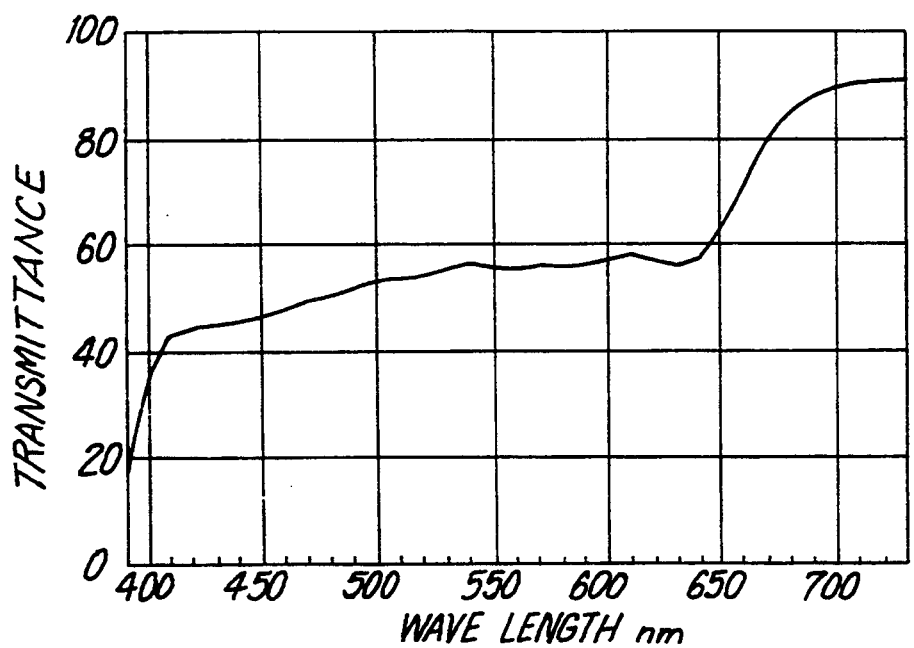
FIG. 4 is a graph showing the spectral transmittance of another sample lens.

Another order was received, in which the target color had the spectral characteristics shown in FIG. 4. The lens material was also a popular type medium refractive index lens treated with hard-multi-coat processing. The dyeing prescription for dyeing a lens the same color as the target color was calculated and it was determined that the color could not be achieved with the existing dye baths. Thus, instructions were provided for preparing a new dye bath by compounding new dyes and calculating new dyeing conditions. The dyeing prescription calculated is shown below in Table 3. The medium refractive index lens was dyed in accordance with the prescription and after an application of coating, its color was measured with a spectrophotometer. The spectral characteristics matched generally with those of the sample color and the dyed lens had a CIELAB color difference of only 0.32, which is acceptably close.

TABLE 3

| | DYEING CONDITIONS | | | | |
|---|---|---|---|---|---|
| COMPOUND AMOUNT OF DYES | | AUXILIARY | TEMP | WATER | DYE TIME |
| Miketon Polyester Brown GF | 0.8 g | | | | |
| Kayalon Polyester Pink BCL-E NIHON (KAYAKU) | 0.2 g | 2 cc | 90° C. | 1 l | 1 Min 38 Sec |
| Sumikaron Blue E-FBL SUMITOMO (KAGAKU) | 1.5 g | | | | |

TABLE 3-continued

| COMPOUND | AMOUNT OF DYES | DYEING CONDITIONS | | | |
|---|---|---|---|---|---|
| | | AUXIL-IARY | TEMP | WATER | DYE TIME |
| Kayalon Polyester Yellow 5R-SE NIHON (KAYAKU) | 0.3 g | | | | |

EXAMPLE 4

Thirty different dye baths for different colors were prepared. As in Example 1, plastic lenses prepared by thermal polymerization of diethylene glycol bisally carbonate were dyed in those dye baths and were examined with respect to coloring speed and decoloring speed. The results of those tests were input into a computer which possessed a dyeing prescription calculating program as described herein. A SEIKO Nouveau Color Wine Rose 50 (SEIKO Standard Color) lens was selected as a target color and was measured by a spectrophotometer. The spectral transmittance of light having wavelengths in the range of 390–730 μm were input into the computer. This transmittance data was processed and the dyeing prescription for the target color was calculated. Three dye baths, from among the 30 dye baths as well as respective dyeing times were each calculated. The dyeing prescription is set forth below in Table 4.

TABLE 4

| ORDER OF DYEING | DYEING CONDITIONS COMPOUNDING AMOUNT OF DYES | | AUXIL-IARY | TEMP | WATER | DYE TIME |
|---|---|---|---|---|---|---|
| 1 | Miketon Polyester Brown GF | 1.0 g | 2 cc | 90° C. | 1 l | 3 Min |
| | Miketon Polyester Rubine GL | 0.2 g | | | | 6 Sec |
| | Eastman Polyester Blue GLF | 1.3 g | | | | |
| 2 | Miketon Polyester Brown GF | 1.0 g | 2 cc | 90° C. | 1 l | 21 Sec |
| 3 | Eastman Polyester Blue GLF | 1.0 g | 2 cc | 90° C. | 1 l | 8 Sec |

When the lens was dyed in accordance with the dyeing prescription and the dyed lens was measured with a spectrophotometer, a CIELAB color difference of 1.23 was obtained. This indicates that the lens was unacceptably different in color than the target color. A slight difference in color could also be observed visually. Therefore, the lens was measured again and another dyeing prescription for shading the lens was calculated. Two types of dye baths and respective dyeing times were determined and this dyeing prescription is shown below in Table 5.

TABLE 5

| ORDER OF DYEING | DYEING CONDITIONS COMPOUNDING AMOUNT OF DYES | | AUXIL-IARY | TEMP | WATER | DYE TIME |
|---|---|---|---|---|---|---|
| 1 | Miketon Polyester Rubine GL | 1.0 g | 2 cc | 90° C. | 1 l | 23 Sec |
| 2 | Miketon Polyester Brown GF | 1.0 g | 2 cc | 90° C. | 1 l | 9 Sec |

The lens was redyed in accordance with the dyeing instructions of Table 5 and was measured again. This time, the lens had a CIELAB color difference of only 0.28 and consequently, passed inspection. No visible difference could be observed in the color of the dyed lens, compared to the target lens.

As has been described above, different types and concentrations of dyes for coloring a lens to achieve a target color may be achieved accurately by performing color mixing calculations using the relative intensity characteristics of prepared dye baths, in relation to the characteristics of the lens. By converting such concentrations into dyeing time or compounding ratios of dyes, an effective dyeing prescription can be obtained. Furthermore, because the prescribing calculation and color judgment of the dyed lens are performed by computer, the lens dyeing method described herein can be performed by a relatively unskilled operator. Accordingly, productivity and color quality control can be improved.

The lens can be dyed directly in an optician's shop and this eliminates problems associated with transporting a color sample or color information from the shop or the dye plant. This reduces the delivery interval and eliminates troubles associated with the care of the samples.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of dyeing a starting lens so that it will have substantially the spectral transmittance characteristics of a target lens, comprising:
   measuring the spectral transmittance characteristics of a starting lens and a target lens;
   preparing a set of standard dye baths for dyeing the starting lens;

dyeing sample lenses in each of the standard dye baths to yield dyed sample lenses;

measuring the spectral transmittance characteristics of the dyed sample lenses and obtaining spectral transmittance characteristics data corresponding to the dyeing characteristics of the respective standard dye baths, including the dyeing concentration of the dye baths as a function of a dyeing time;

formulating a dyeing prescription for dyeing the starting lens, including selecting dye baths for dyeing the starting lens from among the set of standard dye baths, and selecting appropriate dyeing times for the selected dye baths, by adding the spectral transmittance characteristics of dye baths from the set, to the spectral transmittance characteristics of the starting lens in a manner so that the sum of the spectral transmittance characteristics substantially match the spectral transmittance characteristic of the target; and dyeing the starting lens with the selected dye baths for the specified dyeing times as set forth in the formulated dyeing prescription.

2. The method of claim 1, wherein the dyeing prescription is formulated so that the dyed starting lens is within 0.4 CIELAB units of the target.

3. The method of claim 2, wherein the dyeing prescription is formulated to include not more than 5 dye baths.

4. The method of claim 1, wherein the spectral transmittance characteristics data obtained from the standard dye baths is converted into numerical data and is stored in a computer and the dyeing prescription is formulated with a computer.

5. The method of claim 4, wherein the color of the target is selected at a first physical location, the dye baths are located at the first location and the computer storing the dye bath data is located at a different location.

6. The method of claim 1, including measuring the spectral transmittance characteristics of the dyed starting lens and optionally formulating a new dyeing prescription and redyeing the dyed starting lens so that the spectral characteristics thereof are closer to those of the target lens.

7. The method of claim 1, wherein the spectral transmittance characteristics data is compiled from between about 10 to 50 standard dye baths.

8. The method of claim 1, wherein the step of formulating the dyeing prescription includes determining the maximum difference in spectral transmittance between the target lens and the starting lens at the wavelength at which the maximum difference occurs, assigning the maximum difference a value of 1, comparing the difference in spectral transmittance at other wavelengths to the maximum difference and converting the difference at said other wavelengths to a proportional ratio to 1, based on the ratio of the difference in spectral transmittance, to determine the selective intensity characteristic of a dye bath, multiplying the concentration of a dye bath by the relative intensity characteristic of the dye bath and adding this product to the product from different dye baths and to the spectral transmittance characteristic of the starting lens, until the spectral transmittance characteristics of the target color is substantially achieved.

9. The method of claim 8, wherein the dyeing prescription is formulated to include not more than 5 dye baths.

10. The method of claim 9, wherein the standard dye baths all contain a fixed amount of dye in the range of about 2 g/l to 5 g/l.

11. The method of claim 8, wherein the step of formulating the dyeing prescription includes calculating the dyeing time as a function of temperature of the dye bath and adding to the dyeing time to compensate for dye removed from that particular dye bath from previous dyeing operations.

12. The method of claim 1, wherein dyeing is conducted at a selected temperature in the range of about 75° to 95° C.

13. An apparatus for generating a prescription for dyeing a starting lens to have substantially the same spectral transmittance characteristics as those of a target lens, comprising:

measurement means for measuring the spectral transmittance characteristics of a starting lens and a target lens;

a set of standard dye baths;

dye bath data storage means for storing spectral transmittance characteristics data for each dye bath of the set of dye baths;

formulation means for formulating a dyeing prescription by choosing from the set of standard dye baths, selected dye baths for dyeing the starting lens by selecting dye baths and dyeing times for each selected bath so that the sum of the spectral transmittance characteristics data for the selected dye baths is substantially the spectral transmittance characteristics of the target; and output means for displaying the dyeing prescription.

14. The apparatus of claim 13, wherein the measurement means includes a spectrophotometer.

15. The apparatus of claim 14, wherein the dye bath storage means and formulation means include at least one computer.

16. The apparatus of claim 15, wherein the spectrophotometer and output means are at one location and the computer for the dye bath storage means and formulation means is located at a different location.

17. The apparatus of claim 14, wherein the measurement means includes terminal means for receiving a signal from the spectrophotometer and transmitting the color information measured by the spectrophotometer to the other location.

18. The apparatus of claim 17, wherein the apparatus includes about 10 to 50 different dye baths.

19. A method of formulating a prescription for dyeing lenses, comprising the steps of:

selecting a color for a lens;

converting the color selected into numerical data based on the spectral transmittance characteristics of the color lens selected, which are obtained by determining the transmittance values for the selected color over a selected spectrum; and formulating a dyeing prescription based on the numerical data.

20. The method of claim 19, wherein the color is selected at a first location and the numerical data is transmitted to a computer at a second location and the computer formulates compounding ratios of dye baths and dyeing times.

21. The method of claim 20, wherein the selected color is converted to numerical data by selecting a lens having the selected color, measuring the spectral transmittance characteristics of the selected lens with a spectrophotometer and transmitting the spectral transmittance characteristics to the computer.

22. The method of claim 21, wherein the dyeing prescription is formulated by combining spectral characteristics data from dye baths to achieve the spectral characteristics of the selected color and the dyeing times of the dye baths are proportional to the amount of dye needed to be added from that dye bath.

* * * * *